May 13, 1952  F. J. MUFICH ET AL  2,596,909
VALVE DEVICE

Filed Jan. 15, 1948  2 SHEETS—SHEET 1

FRANK J. MUFICH AND
HOWARD S. ROSS
INVENTORS

BY George J. Smyth
ATTORNEY

May 13, 1952 F. J. MUFICH ET AL 2,596,909
VALVE DEVICE
Filed Jan. 15, 1948 2 SHEETS—SHEET 2
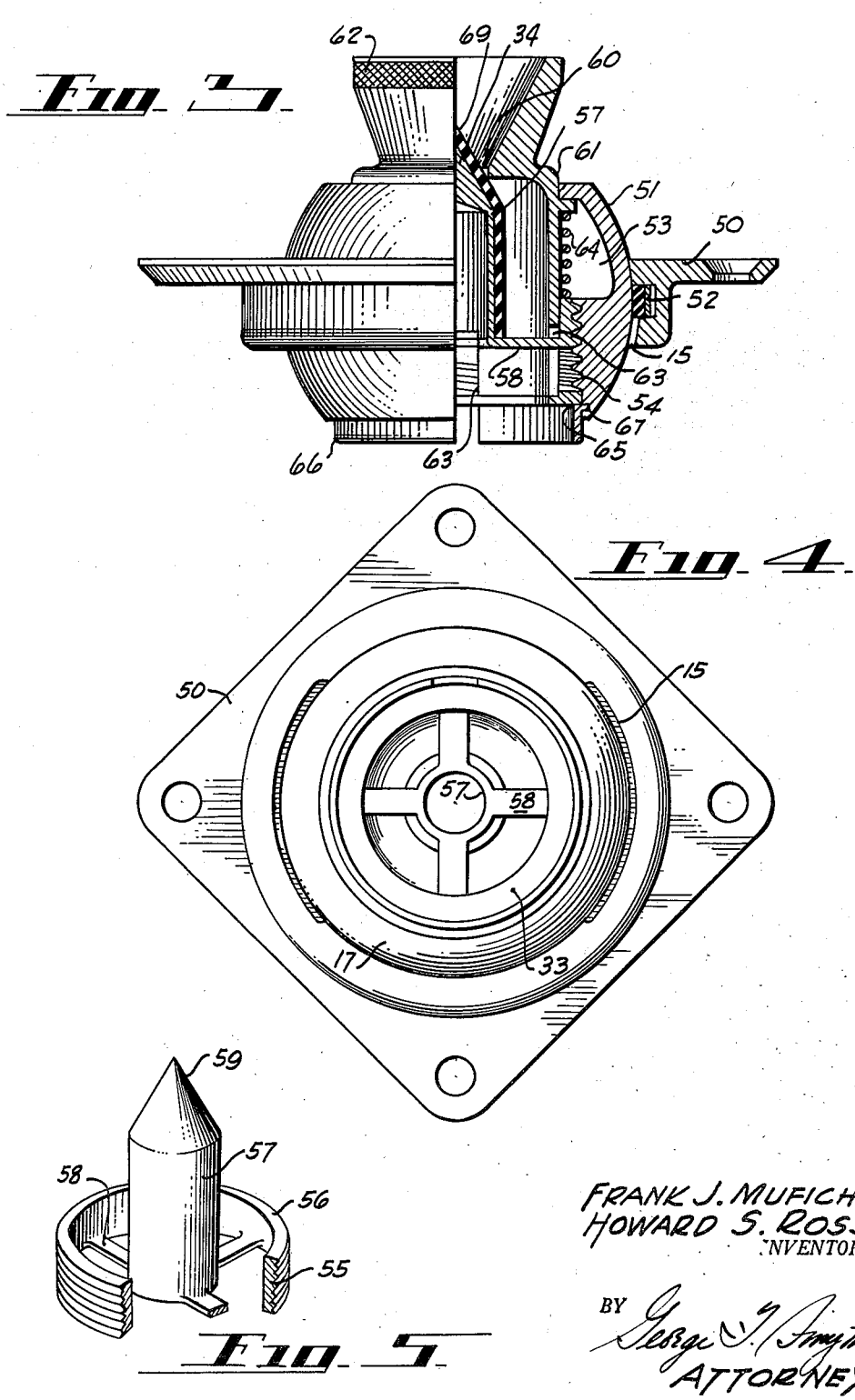
FRANK J. MUFICH AND
HOWARD S. ROSS
INVENTORS
BY
ATTORNEY Patented May 13, 1952

2,596,909

UNITED STATES PATENT OFFICE 2,596,909

VALVE DEVICE

Frank J. Mufich, Inglewood, Calif., and Howard S. Ross, Twin Falls, Idaho, assignors to Wemac Company, Inglewood, Calif., a copartnership composed of Frank J. Mufich and John J. Mufich Application January 15, 1948, Serial No. 2,498

19 Claims. (Cl. 98—40)

This invention relates to valves, and more particularly to a valve adapted to be mounted on a wall of a vehicle, such as an aircraft, a bus, a train or other public conveyance for controllably admitting ventilation air thereinto.

Valves of the type herein disclosed have been heretofore proposed and used but have been subject to a number of objections. Such valves as have been proposed heretofore have generally been complex in proportion to their size and scope of utility, especially if they were adjustable not only to control the volume of air admitted but to also control the angle at which the air is directed into the vehicle. Moreover, many of the valves heretofore used, created objectionable noises particularly when the same were throttled down to reduce the volume of air admitted.

To produce a large range of angular adjustment of the valve, it has been previously proposed to employ a complicated multi-part mounting bracket which not only increased assembly time but the cost of the valve as well. These prior brackets often failed in use particularly where subject to vibration as the multiplicity of parts tended to come apart or loosen.

The valve of the present invention, in all embodiments illustrated, is free of the objections mentioned above for the same is quite compact, easily adjusted both as to volume of air admitted and direction, and is mountable to the wall of the vehicle by a simple, unitary mounting bracket. As the mounting bracket of the valve of the present invention is unitary it is more easily assembled and installed than the multi-piece brackets of many of the prior valves and has a relatively longer service life. Although the mounting bracket is of one-piece construction it does not in any way restrict the range of angular adjustment of the body of the valve.

The noise level of the valve of the present invention is remarkably low even when the same is adjusted to admit but a relatively small volume of air. Passenger comfort is thus increased for a valve having a high noise level is objectionable in that it creates passenger fatigue. The relatively low noise level of the valve of the present invention is brought about by eliminating sharp edged apertures in the discharge path of the air. In all embodiments of the invention illustrated, the air is discharged through an annular opening formed between a conical element disposed in the discharge path and movable relatively to an annular constriction in the discharge passage of the valve to vary the opening and consequently the amount of air discharged.

The air although discharged through an annular opening, because of the position of the conical element, exits without objectionable noises. The air furthermore, because of the position of the conical element tends to flow with little or no turbulence in a relatively narrow stream from the valve. This creates a desirable psychological reaction in the passenger as he is able to distinctly feel the air stream as it impinges against his person. This result is not had where the discharged air is turbulent or is fanned out in a widely diverging stream.

In the one embodiment of the valve illustrated the annular discharge opening is varied or adjusted by fixedly mounting the conical element to the valve body at the end of the discharge passage which is mounted for longitudinal movement relative to the valve body. Thus by merely sliding the element in which the discharge passage is formed, the volume of air discharged can be varied.

In another embodiment of the valve illustrated herein, the conical element is threadedly mounted to the valve body and so connected to the element in which the discharge passage is formed that rotational movement of the element produces axial movement of the conical member relative to the annular constriction formed at the one end of the discharge passage.

In both forms of the invention herein shown, the conical element is disposed at the end of the discharged passage from which air passes into the vehicle. This insures that the air is discharged in a narrow, slightly diverging stream from the valve and without objectionable noises.

Other features and advantages of the present invention will be apparent from the following description taken in connection with the following drawing in which:

Figure 3 is another view like Figure 1 but showing a modified form of the valve shown in Figure 2;

Figure 4 is an end elevational view of the valve of Figure 1; and

Figure 5 is a perspective view of the conical element of the valve of Figure 2.

Figure 1:
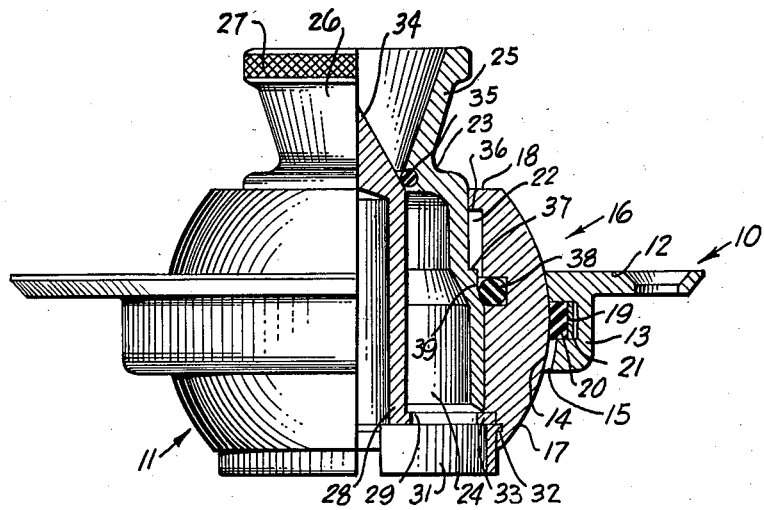
Figure 1 is a side elevational view, partly in section, of one form of the valve of the present invention.

The valve of the present invention in one embodiment thereof, referring now to the drawing and more particularly to Figure 1 thereof, comprises a one-piece mounting bracket 10, and a valvular unit 11 mounted therein for universal movement to control the direction of air admitted through the valve into the vehicle with which it is used.

The mounting bracket 10 consists of a rectangular plate 12 having a circular opening therein. A hollow boss or collar 13 circumscribes the defining edge of the opening and extends substantially normal to the one face of the plate 12. The inner surface 14 of the boss or collar has a spherical contour, that is the inner surface defines a surface of a zone of a sphere.

The inner surface of the boss or collar, at the one end thereof, and in diametrically opposed locations, is provided with arcuate kerfs or grooves 15. The grooves 15 permit the insertion into the mounting bracket of a valve body 16 having the form of a hollow zone of sphere of substantially the same radius as the spherical surface defined by the inner surface of the boss or collar.

In assembling the valve body 16 with the mounting bracket, the body is inserted edgewise or in a transverse position into the opening of the bracket with the portions of the spherical surface 17 of the body which lie at the ends of any major or transverse axis fitting into the kerfs or grooves 15. In this position the truncated, or end, faces 18 of the valve body lie in parallelism with the minor axis of the boss or collar 13. The valve body is then urged inwardly until the center of curvature of the spherical surface 17 is coincident with the center of curvature of the spherical surface 14 after which the valve body is rotated until the truncated end faces 18 lie in parallelism with the planar portions of the mounting bracket 10.

It should be seen now that the valve body 16 is mounted for universal movement relative to the mounting bracket 10. To frictionally hold the valve body in a desired position of adjustment relative to the bracket, the spherical inner surface 14 of the latter is formed with an annular groove 19 receiving a spring-urged gasket assembly. The gasket member 20 of the assembly is preferably formed of a strip of fibrous material such as felt disposed in the groove 19 and urged inwardly somewhat radially of the mounting bracket by one or more resilient metallic strips 21. The spring-pressed felt gasket 20 not only frictionally holds the valve body against accidental movement relative to the mounting bracket but also cooperates with the body to form an air-tight seal between the same and the mounting bracket.

The valve body 16 is formed with a longitudinally disposed passage 22 which receives a tubular member 23 which is constricted, adjacent one end thereof to form within the bore 24 thereof an annular shoulder 25. The portion of the member 23 extending between the shoulder and the adjacent end thereof is flared outwardly to form a somewhat bell-shaped discharge nozzle 26 which terminates in a knurled collar 27 forming the actuating member of the valve.

A valvular element 28 provided with a spinder member 29 at one end thereof is coaxially mounted within the bore of the tubular member 23. The element 28 is held within the bore of the tubular member 23 by a split, resilient locking ring 31 having an out-turned annular flange 32 seating in an annular groove formed in the wall of the passage 22 of the valve body 16. The ring 31, when the flange thereon is seated in its groove, holds a rim element 33 of the spinder member 29 against a shoulder formed on the wall of the passage 22 adjacent the groove receiving the flange 32 of the locking ring.

The opposite end of the valvular element 28 is provided with a conical plug or poppet 34 projecting into the discharge nozzle 26. As the tubular member 23 is slidably mounted within the passage 22 it should now be seen that when the tubular member is in the position shown in Figure 1 with the shoulder 25 thereof engaging the root portion of the plug or poppet 34, the valve is closed and no air can flow therethrough.

To augment the seal effected by the engagement between the shoulder 25 and the root portion of the plug 34, the former is provided with a groove for receiving an O-ring 35 which forms a resilient shoulder against which the root portion of the plug 34 seats when the tubular member 23 is moved inwardly of the valve body 16.

To open the valve to the passage of air therethrough, the knurled collar 27 is grasped by the fingers and the tubular member pulled outwardly to move the O-ring 35 out of engagement with the plug 34. This movement of the tubular member creates an annular opening between the plug and the tubular member so that air entering the bore 24 may pass through the opening created and discharge through the nozzle 25.

The outward movement of the tubular member is limited by stop collars 36 and 37 formed on the wall of the passage 22 and the exterior of the member 23 respectively. Inward movement of the tubular movement is, of course, limited by the engagement of the O-ring 35 with the plug 34.

To prevent leakage between the tubular member 23 and the valve body 16, an O-ring 38 of resilient material disposed in an annular groove formed in the wall of the passage 22, forms an effective seal and at the same time provides frictional resistance to accidental movement of the tubular member.

It should be noted that the tubular member 23 is formed with an annular conical surface 39 which is in substantial alignment with the groove holding the O-ring 38 when the tubular member 23 is moved to its closed position. As the O-ring is under compression the reaction force exerted by the ring against the sloping surface 39 has a component acting longitudinally of the tubular member such that the same is removably held in the valve-closed position when moved into that position.

In the form of the valve of the present invention just described, the same is actuated by merely grasping the knurled collar 27 and slidably urging the tubular member 23 into the desired position. With the tubular member in any position in which the O-ring 35 carried by the shoulder 25 is out of engagement with the plug 34, air entering the bore 24 through the openings intermediate the legs of the spider member 29 flows longitudinally through the bore 24 and into the discharge nozzle 26 through the annular opening formed between the plug or poppet 34 and the shoulder 25.

Air passing into the discharge nozzle flows along the surface of the conical plug or poppet 34 rather than the outwardly flaring surface of the nozzle 26 and leaves the valve in a relatively narrow stream with little if any turbulence. This is due, it is believed, to the position of the conical plug in the discharge passage of the valve.

It has been found that passengers react favorably to the valve of the present invention as the narrow stream of air creates a psychological reaction in that a passenger feels the narrow stream of air much more readily than a widely diverging stream.

The air, furthermore, as it flows outwardly of the discharge opening along the surface of the plug creates no objectionable noises as do many of the previously proposed valves. This is highly desirable as it is well known that a high noise level in a vehicle creates fatigue particularly in a passenger who is subject to the noise for a relatively long period of time.

Figure 2:
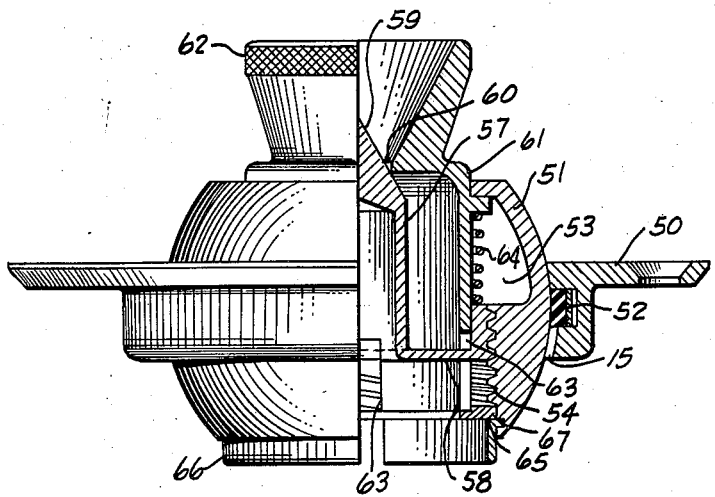
Figure 2 is a view similar to Figure 1 but showing another embodiment of the valve of the present invention.

In the embodiment of the valve of the present invention shown in Figure 2, a mounting bracket 50 identical to the bracket 10 of the earlier described form of the valve is provided for universally mounting a valve body 51 of the same shape as the body 16. The valve body 51 is assembled with the mounting bracket 50 as is the valve body 16 of the first described form of the valve of the present invention and is also held against accidental movement by a spring-urged felt gasket assembly 52 identical to that described in connection with the form of the valve illustrated in Figure 1.

The valve body 51 is formed with a passage 53 a portion of the wall of which is provided with threads 54 for engagement with similar threads 55 formed on the exterior surface of a collar 56 circumscribing and coaxially carried by a valvular member 57. It will be seen, referring now to Figure 5, that the collar 56 is fixed to the valvular member 57 by means of a plurality of arms 58 radially extending outwardly from the base of the valvular member and integrally joining the same and the collar.

The valvular member 57 terminates in a conical plug or poppet 59 which cooperates with a shoulder 60 of a tubular member 61 to vary the flow of air through the valve. The tubular member 61 is formed at the one end thereof with a discharge nozzle similar to that shown at 26 in the earlier described embodiment of the present invention which terminates in a knurled surface 62 to facilitate rotation of the tubular member. The opposite end of the tubular member is formed of a plurality of inwardly extending slots 63 equal in number to the number of the arms 58. The tubular member is telescopically received within the collar 56 as the arms 58 pass through the slots 63 and in effect key the collar to the tubular member. Thus rotation of the tubular member 61 rotatably drives the valvular member 57 which, as should be understood, produces a longitudinal movement of the valvular member because of the threaded engagement between the collar 55 and the body member 51.

Rotation of the tubular member 61 in one direction will thus move the conical plug 59 toward the shoulder 60 to restrict the flow of air while rotation in the opposite direction of the tubular member will move the plug away from the shoulder and increase the annular opening between the shoulder and the plug and consequently the flow of air.

To hold the tubular member 61 and the collar 54 against accidental movement a coiled spring 64 is compressed between the one end face of the collar 54 and an annular flange 65 carried by the tubular member 61. The spring urges the flange into engagement with the inner surface of the body 51 and at the same time lightly binds the threads of the collar, and will thus create frictional resistance sufficient to hold the engaged elements against accidental movement. Furthermore, the spring tends to prevent vibration of the tubular member and collar which might be set up by vibration in the vehicle wall to which the valve is attached.

A flat ring 65 disposed within the passageway 53 of the valve body 51 is formed with an annular groove on its inner periphery which receives the slotted inner edge portion of the tubular member 61. The wall of the groove holds the edge portion against spreading or flaring movement as the tubular member is turned to adjust the plug 59 relative to the shoulder 60. The ring also serves as a stop for the plug and its collar 55 as the ring is held within the passageway of the valve body by a split, resilient sleeve 66 having an annular flange 67 seated in a groove formed about the wall of the passageway 53. The resiliency of the material of the sleeve allows the sleeve to be compressed to the extent necessary to slide the sleeve into the passageway and yet will hold the flange of the sleeve in the groove once the flange moves into alignment with the groove.

As in the earlier described form of the valve of the present invention, air is admitted into the valve through the sleeve 66 and passes into the bore of the tubular member 61 whence it flows around the arms 58 and through the bore to the variable opening between the plug 59 and the shoulder 60. Air discharged through the opening flows along the conical surface of the plug or poppet 59 and emerges from the valve in the narrow, slightly diverging stream mentioned in connection with the form of the valve shown in Figure 1.

As the plug must be arcuate to produce the narrow stream discharged, it may be desirable in some installations to form the point of the plug of some yieldable material. Although this can be accomplished in any way desired, it is now thought that the simplest manner of bringing about this end is to place over the plug a sheath of some suitable material such as rubber.

For example, there is shown in Figure 3 a valve in which a sheath 69 of rubber or some similar material is shown mounted on the plug 57, elements of the valve shown in Figure 3 identical to elements of the valve of Figure 2 being identified by the same reference characters. The sheath 69 can be cemented or otherwise secured to the plug and should present an exterior surface like that of the plug, that is the sheath should taper to a relatively sharp point at its extremity.

It should be borne in mind that although the sheath 69 has been shown as mounted to the plug 57 of the embodiment of the valve of the present invention illustrated in Figure 2 it can be used for the identical purpose on the plug 34 of the embodiment of the valve of the present invention shown in Figure 1.

Although the now preferred embodiments of the present invention have been illustrated and described herein the invention is not to be limited thereto for the same is susceptible to changes in form and detail within the scope of the appended claims.

We claim:

1. A valve of the type described, comprising: a valve body having surfaces defining a substantially hollow zone of a sphere; a tubular member mounted within said body with the longitudinal axis thereof substantially normal to the planar surfaces of said body, said tubular member having a constriction therein adjacent one end thereof forming an inwardly extending annular shoulder; a discharge nozzle coaxially extending outwardly from the constricted end of said tubular member; valvular means; means for mounting said valvular means coaxially of said tubular member for reciprocal movement relative thereto, said valvular means including an acuate terminal portion movable therewith into and out of engagement with said shoulder; said terminal portion being of such a length as to coaxially extend into said nozzle in all positions of adjustment of said valvular means relative to said shoulder; and a mounting member for said valve body having an axial bore with a spheroidal wall forming a seat conforming to the spherical surface of said valve body and rotatably supporting the same.

2. A valve of the type described, comprising: a valve body having surfaces defining a zone of a sphere, said body having a passageway therethrough extending substantially normal to the planar surfaces thereof; a tubular member mounted within said passageway; a discharge nozzle carried by said tubular member at the one end thereof and projecting outwardly of said tubular member; an inwardly extending annular shoulder carried by the wall of the bore of said tubular member adjacent the inner end of said nozzle; valvular means having a conical extremity, the maximum diameter of said extremity being greater than the diameter of the opening defined by said shoulder; means for mounting said valvular means within said tubular member for coaxial movement relative thereto with the conical extremity of said valvular means extending into said nozzle whereby said conical extremity can be moved into and out of engagement with said shoulder; and a mounting member for said valve body having an axial bore with a spherical seat conforming to the spherical surface of said valve body and adapted to rotatably support the same.

3. A valve of the type described, comprising: a valve body having surfaces defining a zone of a sphere, said body having a passageway therethrough extending substantially normal to the planar surfaces thereof; a tubular member slidably mounted within said passageway forming an air passage through said body; a discharge nozzle carried by said tubular member at the one end thereof through which air exits from said valve; an inwardly extending annular shoulder carried by the wall of the bore of said tubular member adjacent said nozzle; valvular means having a conical extremity; means for coaxially mounting said valvular means within said tubular member with the conical extremity thereof extending into said nozzle whereby said shoulder can be moved into and out of engagement with said conical extremity as the tubular member is reciprocally moved relative to said body; and a mounting member for said valve body having an axial bore with a spherical seat conforming to the spherical surface of said valve body and adapted to rotatably support the same.

4. A valve of the type described, comprising: a valve body having surfaces defining a zone of a sphere, said body having a passageway therethrough extending substantially normal to the planar surfaces thereof; a tubular member slidably mounted within said passageway forming an air passage through said body; a discharge nozzle carried by said tubular member at the one end thereof through which air exits from said valve; an inwardly extending annular shoulder carried by the wall of the bore of said tubular member adjacent said nozzle; a resilient annular member carried by said shoulder; valvular means having a conical extremity; means for coaxially mounting said valvular means within said tubular member with the conical extremity thereof extending into said nozzle whereby the resilient member of said shoulder can be moved into and out of engagement with said conical extremity as the tubular member is reciprocally moved relative to said body; and a mounting member for said valve body having an axial bore with a spherical seat conforming to the spherical surface of said valve body and adapted to rotatably support the same.

5. A valve of the type described, comprising: a valve body having surfaces defining a substantially hollow zone of a sphere; a tubular member rotatably mounted within said body with the longitudinal axis thereof substantially normal to the planar surfaces of said body, said tubular member having a constriction therein adjacent one end thereof forming an inwardly extending annular shoulder; valvular means; means including screw threads on said valvular means and complementary screw threads on said body for mounting said valvular means coaxially of said tubular member for reciprocal movement relative thereto; means for connecting said valvular means to said tubular member for rotational movement therewith so that rotation of said tubular member in opposite directions reciprocably moves the valvular means axially of said tubular member into and out of engagement with said shoulder; and a mounting member for said valve body having an axial bore with a spheroidal wall forming a seat conforming to the spherical surface of said valve body and adapted to rotatably support the same.

6. A valve of the type described, comprising: a valve body having surfaces defining a zone of a sphere; said body having a passageway therethrough extending substantially normal to the planar surfaces thereof; a tubular member mounted within said passageway forming an air passage through said body member; a discharge nozzle carried by said tubular member at the one end thereof through which air exits from said valve; an inwardly extending annular shoulder carried by the wall of the bore of said tubular member adjacent said nozzle; valvular means having a conical extremity having a maximum diameter larger than the opening defined by said shoulder; means for mounting said valvular means coaxially within said tubular member for reciprocal movement relative thereto with the conical extremity thereof extending into said nozzle through the opening formed by said shoulder whereby relative reciprocal movement between said valvular means and said tubular member moves said conical extremity into and out of engagement with said shoulder to close and variably open an annular passage between the same and thereby control the flow of air into said nozzle; said conical extremity being of such a length that the same coaxially projects into said nozzle in all positions of adjustment of said valvular means relative to said shoulder; and a mounting member for said valve body having an axial bore with a spherical seat conforming to the spherical surface of said valve body and adapted to rotatably support the same.

7. A valve of the type described, comprising: a valve body having surfaces defining a zone of a sphere, said body having a passageway therethrough extending substantially normal to the planar surfaces thereof; a tubular member slidably mounted within said passageway forming an air passage through said body; a discharge nozzle carried by said tubular member at the one end thereof through which air exits from said valve; an inwardly extending annular shoulder carried by the wall of the bore of said tubular member adjacent said nozzle; valvular means having a conical extremity; means for coaxially mounting said valvular means within said tubular member with the conical extremity thereof extending into said nozzle; said shoulder being movable into and out of engagement with said conical extremity as the tubular member is reciprocally moved relative to said body; means for sealing the annular passage between said tubular member and the wall of said passageway, said sealing means yieldably holding said tubular member against accidental movement relative to said body; and a mounting member for said valve body having an axial bore with a spherical seat conforming to the spherical surface of said valve body and adapted to rotatably support the same.

8. A valve of the type described, comprising: a valve body having a passageway therethrough; a tubular member slidably mounted within said passageway and forming an air passage through said body; an inwardly extending annular shoulder carried by the wall of the bore of said tubular member; a valvular member; means for coaxially mounting said valvular member within said tubular member; said shoulder being movable into and out of engagement with said valvular member as the tubular member is reciprocally moved relative to said body; means for sealing the annular passage between said tubular member and the wall of said passageway, said sealing means yieldably holding said tubular member against accidental movement relative to said body; and a mounting member for said valve body adapted to rotatably support the same.

9. A valve of the type described, comprising: a valve body having surfaces defining a zone of a sphere, said body having a passageway therethrough extending substantially normal to the planar surfaces thereof; a tubular member rotatably mounted within said passageway and forming an air passage through said body; an annular inwardly extending shoulder carried by the wall of the bore of said tubular member; said passageway terminating at one end thereof in a threaded portion; a collar threadedly mounted in said portion for axial movement by rotation relative thereto; valvular means concentrically carried by said collar; means for operatively connecting said collar to said tubular member for rotation therewith whereby rotation of said tubular member produces longitudinal movement of said valvular means into and out of engagement with said shoulder depending upon the direction of rotation of said tubular member; and a mounting member for said valve body having an axial bore with a spheroidal wall forming a seat conforming to the spherical surface of said body and rotatably supporting the same.

10. A valve of the type described, comprising: a valve body having a passageway therethrough; the wall of said passageway being threaded at the one end thereof; a collar having threads engaging the threads of said wall; a plurality of inwardly extending radial arms carried by said collar; a valvular member supported by said arms coaxially of said collar; a tubular member having a number of slots extending inwardly from one end thereof rotatably mounted with said valve body, the slots of said tubular member passing said arms whereby said tubular member is telescopically received within said collar and rotatably drives the latter as the same is rotated to produce a longitudinal movement of said valvular member; an annular inwardly extending shoulder carried by the wall of the bore of said tubular member cooperative with said valvular member to control the flow of air through said tubular member; and a support for said valve body.

11. A valve of the type described, comprising: a valve body having a passageway therethrough; a tubular member slidably mounted within said passageway, the bore of said tubular member forming an air passage through said body; resilient means carried by said body member for sealing the annular passage between said tubular member and the wall of said passageway; an annular conical shoulder formed on the exterior of said tubular member; said resilient means, when said tubular member is slidably moved to a position in which said shoulder is engaged by the same, yieldably holding said tubular member in said position; a valvular member; means for coaxially mounting said valvular member within said tubular member; an inwardly extending annular shoulder formed on the wall of the bore of said tubular member and movable therewith into and out of engagement with said valvular member to close and variably open an annular opening between said shoulder and the valvular member; and means for rotatably mounting said valve body.

12. A valve of the type described, comprising: a valve body having surfaces defining a zone of a sphere, said body having a passageway therethrough extending substantially normal to the planar surfaces thereof; a tubular member mounted within said passageway; a discharge nozzle carried by said tubular member at the one end thereof; an inwardly extending annular shoulder carried by the wall of the bore of said tubular member adjacent said nozzle; valvular means having a conical extremity; means for mounting said valvular means within said tubular member for coaxial movement relative thereto with the conical extremity of said valvular means extending into said nozzle whereby said conical extremity can be moved into and out of engagement with said shoulder; a sheath of resilient material covering said conical extremity for protecting the fingers of a user; and a mounting member for said valve body having an axial bore with a spherical seat conforming to the spherical surface of said valve body and adapted to rotatably support the same.

13. A valve of the type described, comprising: a valve body having a passageway therethrough; a tubular member slidably mounted within said passageway, said tubular member forming an air passage through said body member; resilient sealing means carried by the wall of said passageway and engaging the exterior wall of said tubular member; a discharge nozzle carried by said tubular member at the one end thereof through which air exits from said valve; an inwardly extending annular shoulder carried by the wall of the bore of said tubular member adjacent said nozzle; valvular means having a conical extremity; means for mounting said valvular means coaxially within said tubular member for reciprocal movement relative thereto with the conical extremity thereof extending into said nozzle; relative reciprocal movement between said valvular means and said tubular member moving said conical extremity into and out of engagement with said shoulder to close and variably open an annular passage between the same; and angularly extending annular shoulder exteriorly formed on said tubular member engageable by said resilient sealing means when said tubular member is moved to a position in which said shoulder is engaging said conical extremity, said resilient means acting against said angularly extending shoulder to hold said tubular member with the shoulder thereof engaging said conical extremity; and a mounting member for said valve body.

14. A valve of the type described, comprising: a valve body having a passageway therethrough defining an internal cylindrical wall surface; a tubular member coaxially mounted within said passageway; a discharge nozzle carried by said tubular member and projecting outwardly of the same at one end thereof; an inwardly extending annular shoulder carried by the wall of the bore of said tubular member adjacent the inner end of said nozzle; valvular means having a conical extremity, the maximum diameter of said extremity being larger than the opening defined by said shoulder; means for mounting said valvular means within said tubular member for coaxial movement relative thereto with the conical extremity of said valvular means extending into said nozzle whereby said conical extremity can be moved into and out of sealing engagement with said shoulder; said conical extremity being of such a length relative to the length of the path of movement of said valvular member that said conical extremity remains within said nozzle throughout the entire range of said movement of said valvular means whereby air entering said nozzle in all positions of adjustment of said extremity relative to said shoulder is discharged from said nozzle around said extremity in a relatively narrow stream.

15. A valve of the type described, comprising: a valve body having a passageway therethrough defining an internal cylindrical wall surface; a tubular member coaxially mounted within said passageway; a discharge nozzle carried by said tubular member and projecting outwardly of the same at one end thereof; an inwardly extending anular shoulder carried by the wall of the bore of said tubular member adjacent the inner end of said nozzle; valvular means having a conical extremity, the maximum diameter of said extremity being larger than the opening defined by said shoulder; means for mounting said valvular means within said tubular member for coaxial movement relative thereto with the conical extremity of said valvular means extending into said nozzle and movable inwardly and outwardly relative to said nozzle whereby said conical extremity can be moved into and out of sealing engagement with said shoulder; said conical extremity being of such a length relative to the length of the path of movement of said valvular member that said conical extremity remains within said nozzle throughout the entire range of said movement whereby air entering said nozzle in all positions of adjustment of said extremity relative to said shoulder is discharged from said nozzle around said extremity in a relatively narrow stream, said discharge nozzle being of such a length relative to the length of said conical extremity that the latter in its outermost position of adjustment is disposed within said nozzle with the apex thereof spaced inwardly of the outer edge of said nozzle.

16. A valve of the type described, comprising: a valve body having surfaces defining a zone of a sphere, said body having a pasageway therethrough extending substantially normal to the planar surfaces thereof and terminating at one end thereof in a threaded portion; a tubular member having one end thereof rotatably mounted within said passageway and forming a discharge nozzle at the end projecting from said body member; a valve member; a valve seat to be engaged by said valve member and coacting therewith to control fluid flow through said passageway; a collar concentrically mounted in said passageway and having external threads engaged with the threaded portion of said passageway; a plurality of arms rigidly interconnecting said valve member and collar; drive means carried by the end of said tubular member rotatably mounted in said passageway and drivingly engaged with said arms whereby rotation of said tubular member rotatably drives said collar to produce simultaneous longitudinal movement of said valve member into and out of engagement with said valve seat depending upon the direction of rotation of said tubular member; and a mounting member for said valve body having an axial bore with a spheroidal wall forming a seat conforming to the spherical surface of said valve body and rotatably supporting the same.

17. A valve of the type described, comprising: a valve body having a passageway coaxially extending therethrough and terminating at one end thereof in a threaded portion; a tubular member having one end thereof rotatably mounted within said passageway, the opposite end thereof projecting from said body member and forming a discharge nozzle; a valve member; a valve seat to be engaged by said valve member; a collar mounted in said passageway and having threads engaged with the threaded portion of said passageway; means rigidly interconnecting said collar and said valve member; drive means carried by the end of said tubular member rotatably mounted in said passageway engaged with said interconnecting means whereby rotation of said tubular member rotatably drives said collar to produce longitudinal movement of said valve member into and out of engagement with said valve seat; and a mounting member for said valve body having an axial bore conforming to the surface of said valve body for supporting the same.

18. A valve of the type described, comprising: a valve body having surfaces defining a zone of a sphere and formed with a passageway therethrough, the wall of said passageway at one end thereof being formed with threads; a tubular member having one end thereof rotatably mounted within said passageway, the end of said tubular member projecting from said body member forming a discharge nozzle; a valve member mounted in said passageway and having threads engaged with the threads of the wall of said passageway; means forming a valve seat concentric with said passageway; means carried by the end of said tubular member rotatably mounted in said passageway and engaged with said valve member for connecting said valve member to said tubular member for rotation therewith whereby rotation of the discharge nozzle formed by the projecting end of said tubular member rotatably drives said valve member to produce simultaneous longitudinal movement of said valve member into and out of engagement with said seat depending upon the direction of rotation of said nozzle; and a mounting member for said valve body having an axial bore with a spheroidal wall forming a seat conforming to the spherical surface of said valve body and rotatably supporting the same.

19. A valve of the type described comprising: a valve body having a passageway therethrough; the wall of said passageway at one end thereof being formed with internal threads; a tubular member having one end thereof rotatably mounted within said passageway and forming a discharge nozzle at the end projecting from said body member; means for holding said tubular member against separation from said valve body; a valve member circular in cross-section; means defining an annular shoulder of a diameter smaller than said valve member; a collar mounted in said passageway and having threads engaged with the threads of the wall of said passageway; means connecting said valve member to said collar for movement therewith; drive means carried by the end of said tubular member rotatably mounted in said passageway engaged with said collar whereby rotation of said tubular member rotatably drives said collar to produce simultaneous longitudinal movement of said valve member into and out of engagement with said shoulder depending upon the direction of rotation of said tubular member; and a member for rotatably supporting said body member.

FRANK J. MUFICH.
HOWARD S. ROSS.

REFERENCES CITED

The following references are of record in the file of this patent:

UNITED STATES PATENTS

| Number | Name | Date |
|---|---|---|
| 254,048 | Robertshaw | Feb. 21, 1882 |
| 1,917,216 | Bersted | July 11, 1933 |
| 1,920,840 | Chouinard et al. | Aug. 1, 1933 |
| 2,462,989 | Mufich et al. | Mar. 1, 1949 |

FOREIGN PATENTS

| Number | Country | Date |
|---|---|---|
| 351,050 | Great Britain | June 22, 1931 |
| 360,727 | Great Britain | Nov. 12, 1931 |
| 512,169 | Great Britain | Aug. 30, 1939 |
| 520,452 | Great Britain | Apr. 24, 1940 |